A. J. Dine.
Earth Auger.
N°64,503.   Patented May 7, 1867.
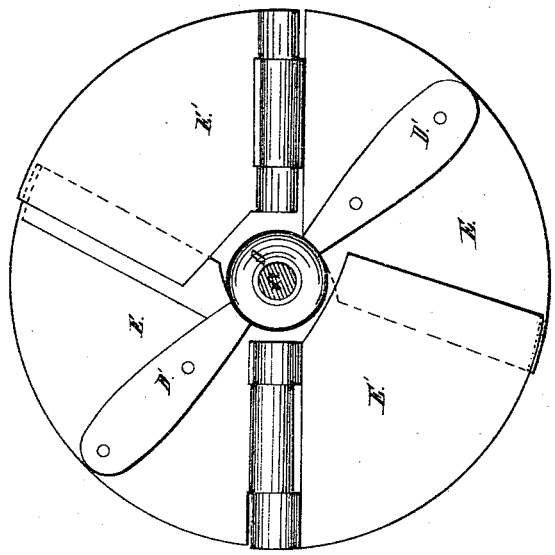
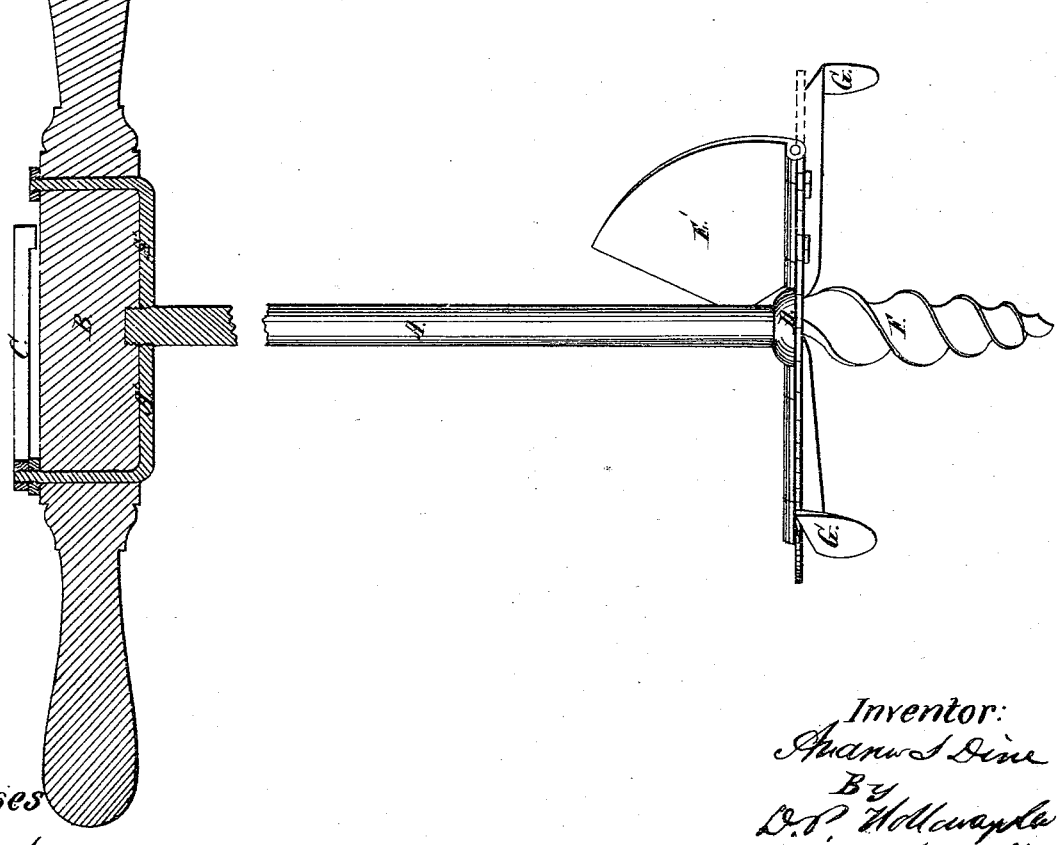
Witnesses
Inventor:

United States Patent Office.

ANDREW J. DINE, OF XENIA, INDIANA.

Letters Patent No. 64,503, dated May 7, 1867.

IMPROVEMENT IN EARTH AUGERS.

*The Schedule referred to in these Letters Patent and making part of the same.*

TO ALL WHOM IT MAY CONCERN:

Be it known that I, ANDREW J. DINE, of Xenia, in the county of Miami, and State of Indiana, have invented a new and useful Improvement in Augers for Boring Post Holes; and I do hereby declare that the following is a full, clear, and exact description of the same, reference being had to the annexed drawings, making part of this specification, in which—

Figure 1 is a side elevation; and
Figure 2 is a plan.

The same letters are employed in the indication of parts which are identical.

A is the shank of the auger, which may be turned by the handle B. One of the stems of the yoke A extends above the nut, by which the shank is attached to the handle; and to this projection a wrench, C, fitting the different nuts used on the auger, is attached. On the lower end of the shank there is cut the thread of a left-hand screw, which passes through the collar D, having wings D' extending therefrom at right angles to the shank A. To these wings are bolted plates E, which are the cutting bits, their front edges being depressed to give them the proper "feed" as the auger is operated, and sharpened so as to penetrate the ground. The plates E are attached about their middle line to the wings D', the cutting point projecting in front towards the direction in which the auger is revolved; and on the back edge of the plate I hinge the valves E', which may be turned upon their hinges so as to permit the earth, and also stones, &c., to pass through. They rest upon the plate E above the cutting edge thereof, so that the earth may be lifted out of the hole after the auger has been inserted. F is a twisted auger-blade attached to the shank A, which, by its hold on the earth as it is twisted, draws the plate E after it. On the exterior edge of the circular plates, at the end of the cutting edge of the same, are vertical cutters G, set at right angles to the plate E, and sharpened on the edge. These cutters are for the purpose especially of cutting the sod, and marking the outside of what is to be the hole when the auger has done its work.

What I claim as my invention, and desire to secure by Letters Patent, is—

A post-hole auger constructed with the parts A, D, D', E, E', F, and G arranged to operate substantially as set forth.

In testimony whereof I have signed my name to this specification in the presence of two subscribing witnesses.

ANDREW J. DINE.

Witnesses:
ALEXANDER STREET,
THOMAS B. SMITH.